United States Patent
Choi et al.

(10) Patent No.: US 9,258,619 B2
(45) Date of Patent: Feb. 9, 2016

(54) METHOD AND APPARATUS FOR PERFORMING IPTV COMMUNICATION SERVICE

(75) Inventors: Hyung-tak Choi, Suwon-si (KR); Soon-back Cha, Suwon-si (KR); Ho Jin, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1675 days.

(21) Appl. No.: 12/508,823

(22) Filed: Jul. 24, 2009

(65) Prior Publication Data

US 2010/0023983 A1    Jan. 28, 2010

Related U.S. Application Data

(60) Provisional application No. 61/083,309, filed on Jul. 24, 2008.

(30) Foreign Application Priority Data

May 25, 2009    (KR) ................. 10-2009-0045471

(51) Int. Cl.
*H04N 21/61* (2011.01)
*H04N 21/4143* (2011.01)
*H04N 21/443* (2011.01)
(Continued)

(52) U.S. Cl.
CPC ........ *H04N 21/6125* (2013.01); *H04L 65/4076* (2013.01); *H04L 67/02* (2013.01); *H04N 21/4143* (2013.01); *H04N 21/4431* (2013.01)

(58) Field of Classification Search
CPC ................. H04N 21/27; H04N 21/4788

USPC ........................................... 725/109
See application file for complete search history.

(56) References Cited

U.S. PATENT DOCUMENTS 6,185,611 B1    2/2001    Waldo et al.
6,594,693 B1    7/2003    Borwankar
(Continued)

FOREIGN PATENT DOCUMENTS

CN    1620129 A    5/2005
CN    1685323 A    10/2005
(Continued)

OTHER PUBLICATIONS

Communication dated Dec. 31, 2011 issued by the State Intellectual Property Office of P.R. China in counterpart Chinese Patent Application No. 200980104286.5.
(Continued)

*Primary Examiner* — Junior Mendoza
(74) *Attorney, Agent, or Firm* — Sughrue Mion, PLLC (57) ABSTRACT

Provided are a method and apparatus for performing an internet protocol television (IPTV) communication service. The method includes: acquiring an application message providing the IPTV communication service from an external input with respect to a general-purpose web application by using plug-in application programming interfaces (APIs) of a web browser which are independent of an IPTV communication service provider; sending the application message to an IP multimedia subsystem (IMS) gateway (IG) functional entity apparatus; and receiving a response message comprising a result of processing the application message as a response to the sending of the application message, from the IG functional entity apparatus.

27 Claims, 8 Drawing Sheets

(51) Int. Cl.
  *H04L 29/06* (2006.01)
  *H04L 29/08* (2006.01)

(56) References Cited

U.S. PATENT DOCUMENTS

| | | | |
|---|---|---|---|
| 7,400,725 | B1 | 7/2008 | Yumiba et al. |
| 7,693,270 | B2* | 4/2010 | Beck et al. ............... 379/142.16 |
| 8,024,765 | B2* | 9/2011 | Ramanathan et al. ........ 725/110 |
| 8,645,487 | B2 | 2/2014 | Sung et al. |
| 2003/0105718 | A1 | 6/2003 | Hurtado et al. |
| 2004/0010808 | A1* | 1/2004 | deCarmo ...................... 725/139 |
| 2004/0103428 | A1 | 5/2004 | Seok et al. |
| 2004/0120344 | A1 | 6/2004 | Sato et al. |
| 2004/0255302 | A1 | 12/2004 | Trossen |
| 2006/0085816 | A1 | 4/2006 | Funk et al. |
| 2006/0117342 | A1 | 6/2006 | Park et al. |
| 2006/0209857 | A1 | 9/2006 | Hicks, III |
| 2006/0259927 | A1 | 11/2006 | Acharya et al. |
| 2006/0291412 | A1 | 12/2006 | Naqvi et al. |
| 2007/0064637 | A1 | 3/2007 | Lee et al. |
| 2007/0079335 | A1* | 4/2007 | McDonough .................... 725/58 |
| 2007/0121584 | A1 | 5/2007 | Qiu et al. |
| 2007/0143444 | A1 | 6/2007 | Kamiya et al. |
| 2007/0162931 | A1 | 7/2007 | Mickle et al. |
| 2007/0206773 | A1 | 9/2007 | Branam |
| 2007/0240200 | A1 | 10/2007 | Han |
| 2007/0250908 | A1 | 10/2007 | Sim et al. |
| 2007/0283385 | A1* | 12/2007 | Qiu et al. .......................... 725/34 |
| 2008/0066095 | A1 | 3/2008 | Reinoso |
| 2008/0123626 | A1* | 5/2008 | Yin ................................. 370/352 |
| 2008/0141285 | A1* | 6/2008 | Lee et al. ........................ 719/328 |
| 2008/0163318 | A1* | 7/2008 | Chen et al. ..................... 725/109 |
| 2008/0201731 | A1* | 8/2008 | Howcroft ........................ 725/13 |
| 2008/0212937 | A1 | 9/2008 | Son |
| 2009/0100147 | A1* | 4/2009 | Igarashi ........................ 709/218 |
| 2009/0133070 | A1* | 5/2009 | Hamano et al. ................ 725/46 |
| 2009/0150956 | A1* | 6/2009 | Van De Leur et al. ........ 725/114 |
| 2009/0180484 | A1 | 7/2009 | Igarashi |
| 2009/0183211 | A1 | 7/2009 | Yan et al. |
| 2009/0222514 | A1 | 9/2009 | Igarashi |
| 2009/0222858 | A1* | 9/2009 | Hjelm et al. .................... 725/47 |
| 2009/0235317 | A1 | 9/2009 | Igarashi |
| 2009/0293079 | A1* | 11/2009 | McKee et al. ................... 725/10 |
| 2009/0307307 | A1 | 12/2009 | Igarashi |
| 2010/0064325 | A1* | 3/2010 | Fishman et al. ................ 725/61 |
| 2011/0035780 | A1* | 2/2011 | Cedervall et al. ............. 725/110 |
| 2011/0041153 | A1* | 2/2011 | Simon et al. .................... 725/46 |
| 2011/0047487 | A1* | 2/2011 | DeWeese et al. ............. 715/758 |
| 2011/0107379 | A1* | 5/2011 | Lajoie et al. .................... 725/87 |
| 2014/0237515 | A1* | 8/2014 | Cantu et al. ..................... 725/38 |

FOREIGN PATENT DOCUMENTS

| | | |
|---|---|---|
| CN | 1798112 A | 7/2006 |
| CN | 1839631 A | 9/2006 |
| CN | 1852411 A | 10/2006 |
| CN | 101060532 A | 10/2007 |
| CN | 101155191 A | 4/2008 |
| EP | 1 182 819 A1 | 2/2002 |
| EP | 1 235 431 A1 | 8/2002 |
| EP | 1 331 785 A1 | 7/2003 |
| EP | 1667454 A1 | 6/2006 |
| EP | 1679896 A1 | 7/2006 |
| EP | 1696668 A1 | 8/2006 |
| EP | 2 000 915 A2 | 12/2008 |
| EP | 2 000 917 A1 | 12/2008 |
| JP | 2002-366835 A | 12/2002 |
| JP | 2007-272868 A | 10/2007 |
| KP | 1020070105628 A | 10/2007 |
| KR | 10-2001-0025456 A | 4/2001 |
| KR | 20010050795 A | 6/2001 |
| KR | 20010080210 A | 8/2001 |
| KR | 10-2006-0025746 A | 3/2006 |
| KR | 10-2006-0025748 A | 3/2006 |
| KR | 10-2006-0066096 A | 6/2006 |
| KR | 10-2006-0103621 A | 10/2006 |
| KR | 10-2006-0120650 A | 11/2006 |
| KR | 10-2007-0032103 A | 3/2007 |
| KR | 10-2007-0053090 A | 5/2007 |
| KR | 10-2007-0061228 A | 6/2007 |
| KR | 10-2007-0061555 A | 6/2007 |
| KR | 10-0754221 B1 | 9/2007 |
| KR | 10-2007-0100069 A | 10/2007 |
| KR | 10-2007-0105164 A | 10/2007 |
| KR | 10-2007-0119351 A | 12/2007 |
| KR | 10-2008-0010862 A | 1/2008 |
| KR | 10-2008-0017662 A | 2/2008 |
| KR | 10-0818300 B1 | 3/2008 |
| KR | 10-0837705 B1 | 6/2008 |
| WO | 0024192 A1 | 4/2000 |
| WO | 01/15423 A1 | 3/2001 |
| WO | 2006/061434 A1 | 6/2006 |
| WO | 2006/122024 A2 | 11/2006 |
| WO | 2007/032652 A1 | 3/2007 |
| WO | 2007/102547 A1 | 9/2007 |
| WO | 2007/102550 A1 | 9/2007 |
| WO | 2007/105460 A1 | 9/2007 |

OTHER PUBLICATIONS

Communication dated Feb. 28, 2013 issued by the State Intellectual Property Office of P.R. China in counterpart Chinese Patent Application No. 200980110455.6.
Communication dated Jan. 5, 2013 issued by the State Intellectual Property Office of P.R. China in counterpart Chinese Patent Application No. 200980126539.9.
Communication, dated Aug. 3, 2012, issued by the Indonesian Patent Office in counterpart Indonesian Application No. W-00201003224.
Open IPTV Forum Standard Function Architecture V1.0 Working Draft, Members of the Open IPTV Forum, Sep. 20, 2007, pp. 1-14.
Communication, dated Jul. 3, 2012, issued by the State Intellectual Property Office of P.R. China in counterpart Chinese Application No. 200980109747.8.
Communication, dated Jun. 27, 2012, issued by the State Intellectual Property Office of P.R. China in counterpart Chinese Application No. 200980104286.5.
Digital Video Broadcasting (DVB) Transport of MPEG-2 Transport Stream (TS) Based DVB Services over IP Based Networks Document DVB A086 Rev.5, Jul. 2007, 126 pages.
International Search Report, dated Jul. 14, 2009, issued by the International Searching Authority in counterpart International Application No. PCT/KR2008/006932.
International Search Report, dated Nov. 11, 2009, issued by the International Searching Authority in counterpart International Application No. PCT/KR2009/001556.
International Search Report, dated Aug. 28, 2009, issued by the International Searching Authority in counterpart International Application No. PCT/KR2009/000737.
International Search Report, dated Nov. 5, 2009, issued by the International Searching Authority in counterpart International Application No. PCT/KR2009/001325.
Communication, dated Jun. 8, 2012, issued by the State Intellectual Property Office of P.R. China in counterpart Chinese Application No. 200980111266.0.
Communication dated Oct. 17, 2011 from the Mexican Institute of Industrial Property in counterpart Mexican application No. MX/a/2010/008642.
Communication dated May 3, 2013 issued by the State Intellectual Property Office of P.R. China in counterpart Chinese Patent Application No. 200880117209.9.
Communication, dated Jun. 8, 2013, issued by the State Intellectual Property Office of P.R. China in counterpart Chinese Patent Application No. 200980111266.0.
Communication, dated Jul. 11, 2013, issued by the European Patent Office in counterpart European Patent Application No. 09723898.4.
"Telecommunications and Internet converged Services and Protocols for Advanced Networking (TISPAN); IPTV Architecture; IPTV functions supported by the IMS subsystem," ETSI TS 182 027 V2.0.0, ETSI, Feb. 29, 2008, 7 pages.

(56) References Cited

OTHER PUBLICATIONS

"Digital Video Broadcasting (DVB); Transport of MPEG-2 TS Based DVB Services over IP Based Networks," ETSI TS 102 034 V1.3.1, ETSI, European Broadcasting Union, Oct. 31, 2007, pp. 1-128.
"IPTV architecture Dedicated subsystem for IPTV functions in NGN," Draft ETSI DTS 02049 V0.0.9, ETSI, Sep. 2007, pp. 1-37.
Stallard, Paul, et al., "DVB thoughts on Service Discovery and Selection," The Internet Society, Feb. 10, 2003, pp. 1-11.
"Telecommunications and Internet Converged Services and Protocols for Advanced Networking (TISPAN); IMS based IPTV Stage 3 Specification," ETSI TS 183 063 V0.0.6, ETSI, Nov. 2007, pp. 1-81.
Communication dated Jan. 15, 2014, issued by the European Patent Office in counterpart European Application No. 08855589.1.
Communication dated Jan. 28, 2014, issued by the European Patent Office in counterpart European Application No. 09704767.4.
Nishimoto et al.; "Advanced Conditional Access System for Digital Broadcasting Receivers Using Metadata", IEEE Transactions on Broadcasting, Sep. 2007, vol. 53, No. 3, pp. 697-702.
"Broadcast and On-line Services: Search select, and rightful use of content on personal storage systems(TV-Anytime); Part 2:Phase 1—System description", European Broadcasting Union, Nov. 2007, pp. 1-127.
Communication dated Apr. 3, 2014, issued by the European Patent Office in counterpart European Application No. 09723898.4.
Communication dated Mar. 20, 2012, issued by the State Intellectual Property Office of the People's Republic of China in counterpart Chinese Application No. 200980103120.1.
Search Report dated Jun. 22, 2009, issued by the International Searching Authority in counterpart International Application No. PCT/KR2009/000370.
Written Opinion dated Jun. 22, 2009, issued by the International Searching Authority in counterpart International Application No. PCT/KR2009/000370.
Search Report dated Jul. 10, 2009, issued by the International Searching Authority in counterpart International Application No. PCT/KR2009/000549.
Written Opinion dated Jul. 10, 2009, issued by the International Searching Authority in counterpart International Application No. PCT/KR2009/000549.
Communication dated Nov. 5, 2012, issued by the State Intellectual Property Office of the People's Republic of China in counterpart Chinese Application No. 200880117209.9.
Communication dated Sep. 29, 2011, issued by the European Patent Office in counterpart European Application No. 09704867.2.
Search Report dated Aug. 18, 2009, issued by the International Searching Authority in counterpart International Application No. PCT/KR2009/000323.
Written Opinion dated Aug. 18, 2009, issued by the International Searching Authority in counterpart International Application No. PCT/KR2009/000323.
Communication issued on Jan. 19, 2015 by the European Patent Office in related Application No. 09704767.4.
Communication issued Jul. 2, 2014; in related Chinese Patent Application No. 200980111266.0.
Communication issued Sep. 17, 2014; in related Korean Patent Application No. 10-2008-0114751.
Communication dated Jan. 21, 2015 issued by the Korean Intellectual Property Office in counterpart Korean Patent Application No. 10-2009-7015542.
Communication dated Feb. 13, 2015 issued by the Korean Intellectual Property Office in counterpart Korean Patent Application No. 10-2009-7015543.
Communication dated Mar. 23, 2015 issued by the Korean Intellectual Property Office in counterpart Korean Patent Application No. 10-2009-7006208.
Communication dated Mar. 23, 2015 issued by the Korean Intellectual Property Office in counterpart Korean Patent Application No. 10-2009-7006209.
IPTV Architecture—Dedicated Subsystem for IPTV Functions in NGN, European Telecommunications Standards Institute(ETSI) TS 182 028 V2.0.0(Jan. 17, 2008); 38 pgs.
Transport of MPEG-2 TS Based DVB Services Over IP Based Networks,European Telecommunications Standards Institute(ETSI) TS 102 034 V1.3.1(Oct. 29, 2007); 128 pgs.
Communication, dated Dec. 23, 2013, issued by the State Intellectual Property Office of the People's Republic of China in counterpart Chinese Application No. 200980111266.0.
Communication, dated Jan. 29, 2014, issued by the European Patent Office in counterpart European Application No. 09723546.9.
Communication, dated Mar. 3, 2014, issued by the European Patent Office in counterpart European Application No. 09707306.8.
ETSI TS 182 028 v2.0.0, "Telecommunications and Internet converged Services and Protocols for Advanced Networking (TISPAN); IPTV Architecture; Dedicated subsystem for IPTV functions," (Jan. 2008), ETSI, pp. 9-46.
Communication dated Oct. 28, 2014 issued by the Korean Intellectual Property Office in counterpart Korean Patent Application No. 10-2008-0044013.
Communication dated Dec. 16, 2014 issued by the Indian Intellectual Property Office in counterpart Indian Patent Application No. 961/MUMNP/2010.
Communication dated Nov. 14, 2014 issued by The State Intellectual Property Office of P.R. China in counterpart Chinese Patent Application No. 200980109747.8.
Communication, dated Apr. 16, 2014, issued by the State Intellectual Property Office of P.R. China in counterpart Chinese Patent Application No. 200980109747.8.
Communication, dated Jun. 11, 2014, issued by the European Patent Office in counterpart European Patent Application No. 09711644.6.
Beck, Andre, et al., "IMS and IPTV Service Blending—Lessons and Opportunities," Journal of the Institute of Telecommunications Professionals, Jan. 1, 2007, pp. 1-6, http://www.icin.co.uk/files/programmes/Session8A-2.pdf.
Communication dated Apr. 30, 2015, issued by the Korean Intellectual Property Office in counterpart Korean Application No. KR 10-2008-0044013.
Communication dated May 18, 2015, issued by the Korean Intellectual Property Office in counterpart Korean Application No. KR 10-2009-0045471.
"Open IPTV Forum—Functional Architecture—V 1.0 Open IPTV Forum Confidential Copyright 2007 Members of the Open IPTV Forum", Sep. 20, 2007, Total 103 pages, XP 55094424, URL: http://www.oipf.tv/docs/OIPF-T1-R1-Functional Architecture-V1 0/2007-09-20.pdf.
Communication dated May 20, 2015, issued by the European Patent Office in counterpart European Application No. 09800581.2.
Communication dated Jul. 2, 2015, issued by the European Patent Office in counterpart European Application No. EP 08855589.1.
Communication dated Sep. 17, 2015 issued by Korean Intellectual Property office in counterpart Korean Patent Application No. 10-2009-7006208.
Communication dated Sep. 23, 2015 issued by Korean Intellectual Property office in counterpart Korean Patent Application No. 10-2009-7006209.
Communication dated Oct. 28, 2015 issued by The State Intellectual Property Office of P.R. China in counterpart Chinese Patent Application No. 200980109747.8.

* cited by examiner

| Object | Return value | Property / Method |
|---|---|---|
| Buddy | String | callerID |
| | String | Name |
| | String | friendlyName |
| | String | logoURL |
| | Integer | status |
| BuddyGroupCollection | Integer | length[R] |
| | BuddyGroup | item( Integer index ) |
| | BuddyGroup | addBuddyGroup( String buddyGroupName ) |
| | Boolean | deleteBuddyGroup( Integer buddyGroupID ) |
| | Buddy | findBuddy( String callerID ) |
| | Buddy | createBuddy() |
| BuddyGroup | String | buddyGroupName [R] |
| | String | buddyGroupID [R] |
| | Integer | length [R] |
| | Buddy | item( Integer index ) |
| | Integer | addBuddy( Buddy newBuddy ) |
| | Boolean | deleteBuddy( Integer buddyID ) |
| | Boolean | modifyBuddy( Integer buddyID, Buddy modifiedBuddy ) |
| | Boolean | modifyBuddyGroupName( String GroupName ) |

FIG. 6

| Object | Return value | Property / Method |
|---|---|---|
| Presence | BuddyGroup Collection | BuddyGroupList[R] |
| | Boolean | permitSharingCurrentContent( String[ ] destID, String ContentURL ) |
| | Boolean | inviteSharingExternalApplication( String[ ] destID, String ExternalAppURI ) |
| Messaging | String | OnReceiveSMS |
| | Boolean | sendSMS( String sendingSMS, CallerList destCallerList ) |
| ChattingManager | String[ ] | callerList |
| | String | onReceivingMessage |
| | String | onInviteChat |
| | Integer | createSession() |
| | Boolean | closeSession( Integer sessionID ) |
| | Boolean | inviteChat( String[ ] desCallerList, String sessionID ) |
| | Boolean | sendMessage( String sendingMessage, String sessionID ) |

FIG. 7

| Object | Return value | Property / Method |
|---|---|---|
| CallManager | Integer | width |
| | Integer | Height |
| | Integer | Volume[R] |
| | Boolean | bFullScreen |
| | String | onFullScreenChange |
| | String | onCallError |
| | String | onCallSucceeded |
| | String | onCallInvited |
| | String | onVolumeChanged |
| | String | onPipPositionChanged |
| | Boolean | makeCall( String callerID, Boolean bVideoCall ) |
| | Boolean | acceptCall( String callerID, Boolean bAcceptVideoCall=FALSE) |
| | Boolean | cancelCall( String callerID ) |
| | Boolean | hangupCall( String callerID ) |
| | Boolean | rejectCall( String callerID ) |
| | Boolean | setPipPosition( Integer pipPosition ) |
| | Boolean | setEableMyCamera( Boolean bEableMyCamera ) |
| | Boolean | setEableMyMIC( Boolean bEableMyMIC ) |
| | Boolean | setFullScreenCall( Boolean bFullScreen ) |
| | Boolean | setVolume( Integer callVolume ) |

FIG. 8

METHOD AND APPARATUS FOR PERFORMING IPTV COMMUNICATION SERVICE

CROSS-REFERENCE TO RELATED PATENT APPLICATION

This application claims the benefit of Korean Patent Application No. 10-2009-0045471, filed on May 25, 2009, in the Korean Intellectual Property Office, and U.S. Provisional Application No. 61/083,309, filed on Jul. 24, 2008, in the United States Patent and Trademark Office, the disclosures of which are incorporated herein in their entirety by reference.

BACKGROUND OF THE INVENTION

1. Field of the Invention

Methods and apparatuses consistent with the present invention relate to performing an internet protocol television (IPTV) communication service by using plug-in application programming interfaces (APIs) of a web browser, the APIs being independent of an IPTV communication service provider.

2. Description of the Related Art

An internet protocol television (IPTV) communication service denotes a service providing an information service, a video content service, and a broadcasting service to TVs through an IP network, that is, a high-speed internet network. As a communication-broadcasting convergent service is being developed, interest in IPTV services is growing. Activation of the IPTV service may greatly affect not only communication and broadcasting industries but also content manufacturing and home appliance industries.

Conventionally, in order for an IPTV service user to be provided with the IPTV service through an IP network, the IPTV service user may own set-top boxes that are different for each IPTV vendor. Only the IPTV service user who owns an IPTV set-top box manufactured according to the standards set by an IPTV service provider providing an IPTV service may be provided with the IPTV service from the corresponding IPTV service provider. For example, when there are three IPTV service providers A, B, and C, a user who purchases A's set-top box may only use an IPTV service provided from A. Also, in order to use an IPTV service from B or C, a set-top box manufactured by B or C are separately purchased. Due to such a compatibility problem between the IPTV services and the set-top boxes, selection of the IPTV services is limited and consequently, the quality of the IPTV services deteriorates or it is difficult to expand a service base.

In this regard, an open IPTV forum has been recently established and the standardization is under discussion. In this forum, common standards, which are not dependent upon IPTV service providers, are formed and the provision of IPTV services to service users based on the common standards is under discussion.

The open IPTV forum aims to form an interface and a hardware platform which are not dependent upon IPTV service providers and to use IPTV services provided from a plurality of IPTV service providers by users. According to open IPTV forum architecture, even if the user does not own the set-top boxes that are different for each IPTV service provider, the user may use the IPTV services provided from a plurality of different IPTV service providers and thus a range of selection for the services may be expanded.

In order for the user to use the services provided from the plurality of different IPTV service providers, apparatuses for relaying services provided from the plurality of different IPTV service providers are present in a residential network having functional architecture according to the open IPTV forum. The apparatuses may be entities such as Application Gateway (AG), IMS Gateway (IG), and CSP Gateway (CG) according to the functional architecture of the open IPTV forum. These relaying apparatuses receive IPTV services provided from a provider network outside of the residential network and relay the received IPTV services to a terminal included in the residential network.

SUMMARY OF THE INVENTION

Exemplary embodiments of the present invention provide a method and apparatus for performing an internet protocol television (IPTV) communication service by using plug-in application programming interfaces (APIs) of a web browser, the APIs being independent of an IPTV communication service provider, and a computer readable recording medium having embodied thereon a computer program for executing the method.

According to an aspect of the present invention, there is provided a method of performing an internet protocol television (IPTV) communication service, the method including: acquiring an application message providing the IPTV communication service from an external input with respect to a general-purpose web application by using plug-in application programming interfaces (APIs) of a web browser which are independent of an IPTV communication service provider; sending the application message to an IP multimedia subsystem (IMS) gateway (IG) functional entity apparatus; and receiving a response message comprising a result of processing the application message as a response to the sending of the application message from the IG functional entity apparatus.

The method may further include: receiving an application message providing the IPTV communication service from the IG functional entity apparatus; sending the application message to the web browser by using the plug-in APIs for processing an event informing reception of the application message; and outputting the application message through the general-purpose web application.

The method may further include: acquiring a session setting request message for the application providing the IPTV communication service from an external input with respect to the general-purpose web application by using the plug-in APIs; sending the session setting request message to the IG functional entity apparatus; and receiving a response message for the session setting request message from the IG entity apparatus.

The sending of the application message and the reception of the application message may be performed during the set session.

The method may further include: acquiring a session completion request message for the application providing the IPTV communication service from an external input with respect to the general-purpose web application by using the plug-in APIs; sending the session completion request message to the IG functional entity apparatus; and receiving a response message for the session completion request message from the IG functional entity apparatus.

The plug-in APIs for acquiring the application message providing the IPTV communication service may include messages to be sent to a remote user and a remote user identifier as input arguments.

The plug-in APIs for processing an event informing reception of the application message may include a received message as a return value.

The plug-in APIs for acquiring the session setting request message may include a session identifier (ID) as return values.

The plug-in APIs for acquiring the session completion request message may include a session identifier (ID) as an input argument.

The plug-in APIs for acquiring the application message providing the IPTV communication service on the set session may include a message to be sent to the remote user and the session ID as input arguments.

The plug-in APIs for processing an event informing about reception of the application message during the set session may include a received message as a return value.

The method may further include: performing at least one of the plug-in APIs providing a list of users who use the IPTV communication service, the length of the list of users, specific user information for a specific index in the list of users, a function of adding a specific user to the list of users, a function of deleting a specific user from the list of users, and a function of modifying a specific user in the list of users.

The method may further include: performing at least one of the plug-in APIs providing the number of user groups formed of the list of users who use the IPTV communication service, specific user group information for a specific index in the user groups, a function of adding a specific user group to the user groups, and a function of deleting a specific user group from the user groups.

According to another aspect of the present invention, there is provided an open IPTV Terminal Function (OITF) entity apparatus including: a first plug-in unit acquiring an application message providing the IPTV communication service from an external input with respect to a general-purpose web application by using plug-in application programming interfaces (APIs) of a web browser which are independent of an IPTV communication service provider; an application message sending unit sending the application message to an IP multimedia subsystem (IMS) gateway (IG) functional entity apparatus; and a response message receiving unit receiving a response message comprising a result of processing the application message as a response to the sending of the application message from the IG functional entity apparatus.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. In the drawings, like reference numerals denote like elements and the thicknesses of layers and regions are exaggerated for clarity.

Figure 1:
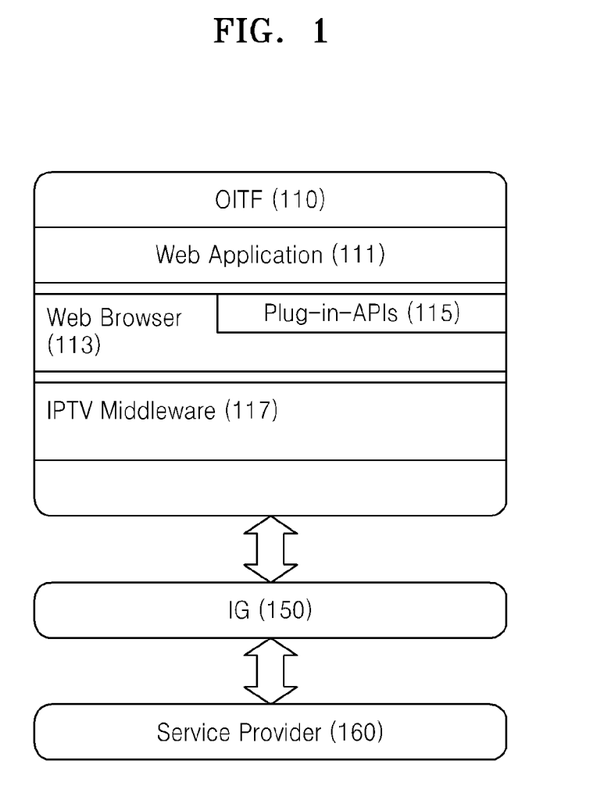
FIG. 1 is a schematic view for explaining a method of performing an internet protocol television (IPTV) communication service according to an exemplary embodiment of the present invention.

FIG. 1 is a schematic view for explaining a method of performing an internet protocol television (IPTV) communication service according to an exemplary embodiment of the present invention.

In the present exemplary embodiment, at least one IPTV service provider 160 provides a predetermined IPTV communication service to an IPTV user terminal, that is, an Open IPTV Terminal Function (OITF) entity apparatus 110.

The OITF entity apparatus 110 is an apparatus for performing entity functions of a user domain according to open IPTV forum architecture. The OITF entity apparatus 110 accesses the IPTV service provided by the service provider 160 through gateways of the user domain, that is, an application gateway (AG) functional entity apparatus and an IP multimedia subsystem (IMS) gateway (IG) functional entity apparatus 150. An apparatus, which finally uses the IPTV service such as a TV, may be the OITF entity apparatus 110.

The IG functional entity apparatus 150 is an apparatus for permitting access to the IPTV service linked to an IMS. The IG functional entity apparatus 150 receives the IPTV service provided from the service provider 160 and relays the received IPTV service to the OITF entity apparatus 110. The IG functional entity apparatus 150 interacts with the OITF entity apparatus 110 by using a predetermined protocol defined for interaction within a residential network. The IG functional entity apparatus 150 requests the service provider 160 to provide the IPTV service according to a request to provide the IPTV service by the OITF entity apparatus 110 and receives the IPTV service from the service provider 160 for relaying the received IPTV service to the OITF entity apparatus 110.

IPTV middleware 117 of the OITF entity apparatus 110 performs functions of establishing an IPTV network through the IG functional entity apparatus 150, searching and selecting an IPTV service provider through an IPTV service provider searching entity apparatus (not shown), and searching and accessing IPTV communication service applications provided by the service provider selected through the IPTV service provider searching entity apparatus (not shown) or an IPTV service searching entity apparatus (not shown).

Examples of applications for providing the IPTV communication service may include a chatting application, an instant message application, a voice over IP (VoIP) application, a multimedia over IP (MoIP) application, and a presence application. The chatting application provides a chatting service and the instant message application provides a messaging service. The VoIP application allows telephonic communication, as in a general telephone network, using a packet network for data communication. The MoIP application supports not only voice calls but also video communication by using a packet network for data communication. The presence application provides a service in which an online state and a location of a user are used.

A user of the OITF entity apparatus 110 inputs uniform resource identifier (URI) information used to access the IPTV communication service in a web browser 113 and thus may access the searched IPTV communication service application.

A user of the OITF entity apparatus 110 accesses the IPTV communication service applications from the web browser 113 and then may use the IPTV communication service through a web application 111. The functions of each application for providing the IPTV communication service are supported by plug-in application programming interfaces (APIs) 115 which are independent of the service provider 160.

According to the present exemplary embodiment, standardized plug-in APIs of a web browser, which are independent of the IPTV communication service provider, are provided and thus the OITF entity apparatus 110 may use the IPTV communication service including the chatting application, the instant message application, the VoIP application, the MoIP application, and the presence application independently of the service provider 160. Accordingly, a user of the OITF entity apparatus 110 may use the IPTV communication service with other users who use the IPTV communication service applications provided from different service providers. In addition, the service provider does not need to develop and provide non-standardized IPTV communication service applications and instead, may develop and provide general-purpose web applications by using the standardized plug-in APIs of a web browser.

Figure 2:
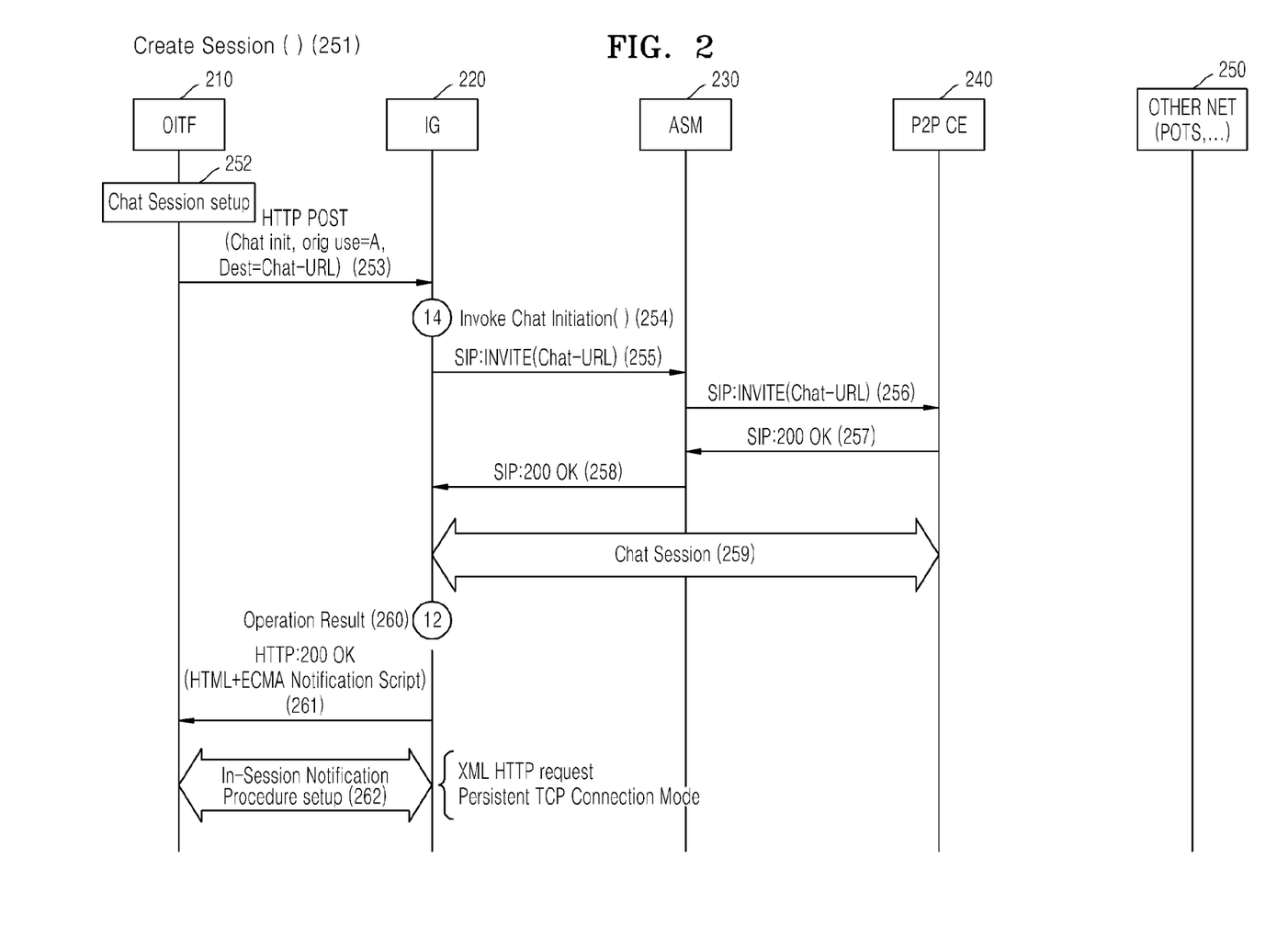
FIG. 2 is a flowchart illustrating a session setting process for applications providing an IPTV communication service according to an exemplary embodiment of the present invention.

FIG. 2 is a flowchart illustrating a session setting process for applications providing the IPTV communication service according to an embodiment of the present invention.

A user of an OITF entity apparatus 210 requests to set a session for applications providing the IPTV communication service through the web application 111, in operation 252. The request to set a session is transmitted to the web browser 113 by using a "createSession" plug-in API 251. In the present embodiment, the "createSession" plug-in API 251 is provided to request the setting of a session. Other plug-in APIs performing the same functions having other method names, other input arguments, and other return values may be used.

In operation 253, the IPTV middleware 117 of the OITF entity apparatus 210 generates a session setting request message by using a hypertext transfer protocol (HTTP) and transmits the generated message to an IG functional entity apparatus 220.

In operations 254 through 256, the session setting request message is converted into a session initiation protocol (SIP) and is transmitted to a peer-to-peer communication enabler (P2P CE) entity apparatus 240 from the IG functional entity apparatus 220 via an Authentication and Session Management (ASM) entity apparatus 230. The ASM entity apparatus 230 and the P2P CE entity apparatus 240 perform network domain entity functions managed by the service provider. The ASM entity apparatus 230 performs access management and IPTV service session management so that only a specific user may access a network domain managed by the service provider. The P2P CE entity apparatus 240 provides interfaces for the IPTV communication service applications in the network domain.

In operations 257 through 258, a response message for the session setting request message is transmitted from the P2P CE entity apparatus 240 to the IG functional entity apparatus 220 via the ASM entity apparatus 230 by using the SIP.

In operation 259, session setting between the IG functional entity apparatus 220 and the P2P CE entity apparatus 240 is completed.

In operations 260 through 262, the OITF entity apparatus 210 and the IG functional entity apparatus 220 set and manage connections for transmitting and receiving various events related to the session set in operation 259.

A user of the OITF entity apparatus 210 may request to complete a session for applications providing the IPTV communication service through the web application 111. The request to complete a session is transmitted to the web browser 113 by using a "closeSession" plug-in API. In the present embodiment, the "closeSession" plug-in API is provided to request to complete a session. Other plug-in APIs performing the same functions having other method names, other input arguments, and other return values may be used.

The IPTV middleware 117 of the OITF entity apparatus 210 generates a session completion request message by using the HTTP protocol and transmits the generated message to an IG functional entity apparatus 220.

The session completion request message is converted into a SIP and is transmitted to the P2P CE entity apparatus 240 from the IG functional entity apparatus 220 via the ASM entity apparatus 230.

A response message for the session completion request message is transmitted from the P2P CE entity apparatus 240 to the IG functional entity apparatus 220 via the ASM entity apparatus 230 by using the SIP. Accordingly, a session between the IG functional entity apparatus 220 and the P2P CE entity apparatus 240 is completed.

Figure 3:
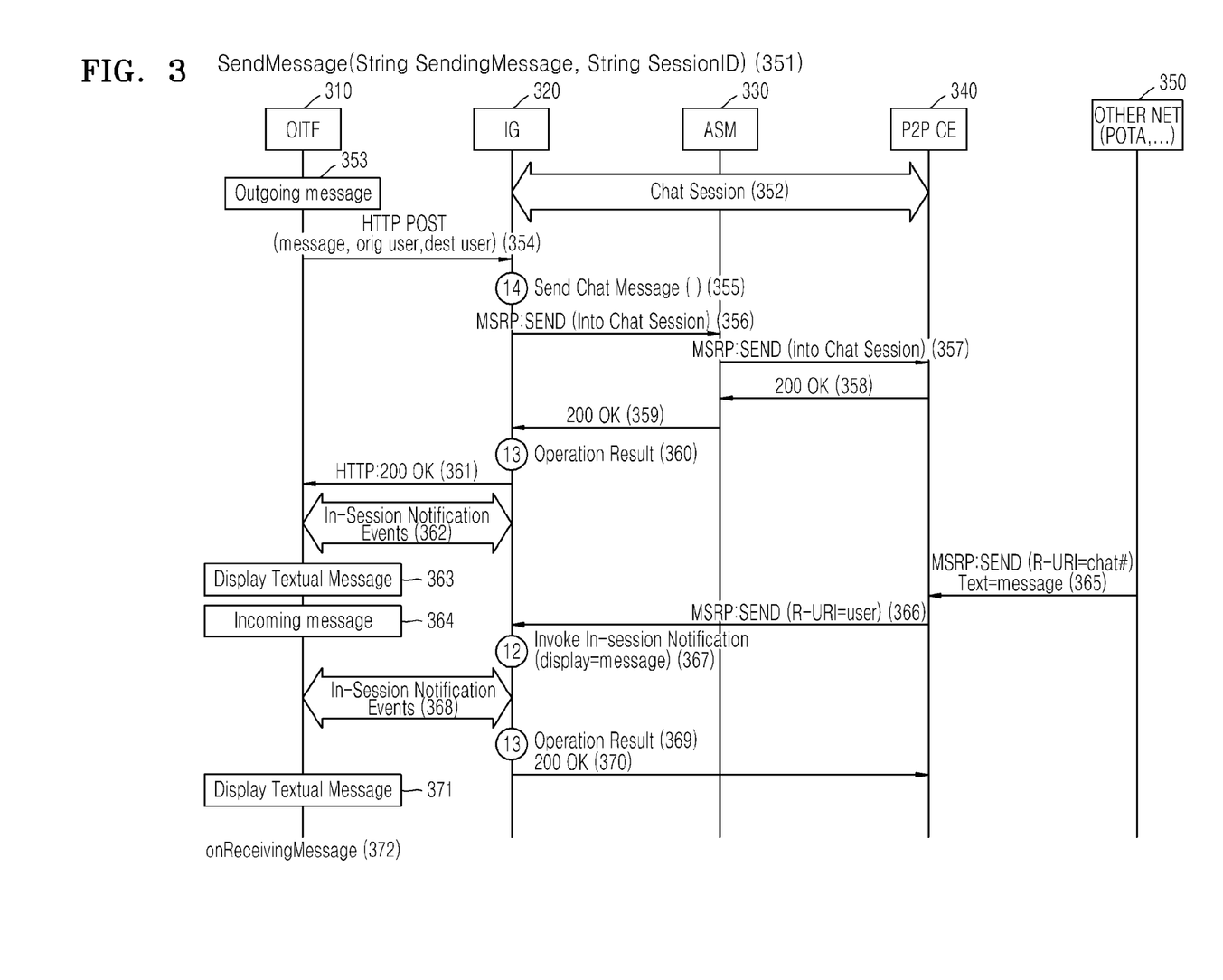
FIG. 3 is a flowchart illustrating transmitting and receiving application messages on a session set for applications providing an IPTV communication service according to an exemplary embodiment of the present invention.

FIG. 3 is a flowchart illustrating transmitting and receiving application messages on a session set for the applications providing the IPTV communication service according to an exemplary embodiment of the present invention.

A user of an OITF entity apparatus 310 acquires a message for applications providing the IPTV communication service through the web application 111, in operation 353. The acquired application message is transmitted to the web browser 113 by using a "sendMessage" plug-in API 351. In the present exemplary embodiment, the "sendMessage" plug-in API 351 is provided to acquire the application message. Other plug-in APIs performing the same functions having other method names, other input arguments, and other return values may be used.

In operation 354, the IPTV middleware 117 of the OITF entity apparatus 310 transmits the application message to an IG functional entity apparatus 320 by using the HTTP protocol.

In operations 355 through 357, the application message is converted into a message session relay protocol (MSRP) and is transmitted to a P2P CE entity apparatus 340 from the IG functional entity apparatus 320 via an ASM entity apparatus 330 in a session 352 that is previously set. The MSRP is an Internet engineering task force (IETF) standard for transmitting a series of instant messages in a session. A detailed description of the MSRP will be omitted herein.

In operations 358 through 360, a response message including a result of processing the application message is transmitted to the IG functional entity apparatus 320 from the P2P CE entity apparatus 340 via the ASM entity apparatus 330 by using the MSRP.

In operations 361 through 363, the OITF entity apparatus 310 is informed of the result of processing the application message from the IG functional entity apparatus 220 as an event and outputs the result.

A user of the OITF entity apparatus 310 may receive an application message from a remote user who uses the IPTV communication service applications.

In operations 365 through 366, the application message received from the remote user is transmitted to the IG functional entity apparatus 320 from the remote user by using the MSRP. In the present exemplary embodiment, the remote user who uses the IPTV communication service applications is a user using a plain old telephone service (POTS). However, the present embodiment may be applied to remote users who use other services. The POTS is a basic voice call service which is widely used in residential homes.

In operations 367 through 370, the OITF entity apparatus 310 receives the event informing reception of the application message from the IG functional entity apparatus 320.

In operation 371, the received application message is transmitted to the web browser 113 of the OITF entity apparatus 310 by using an "onReceivingMessage" plug-in API 372. The OITF entity apparatus 310 outputs the application message received through the web application 111. In the present exemplary embodiment, the "onReceivingMessage" plug-in API 372 is provided to process the event informing the reception of the application message. However, other plug-in APIs performing the same functions having other method names, other input arguments, and other return values, may be used.

Figure 4:
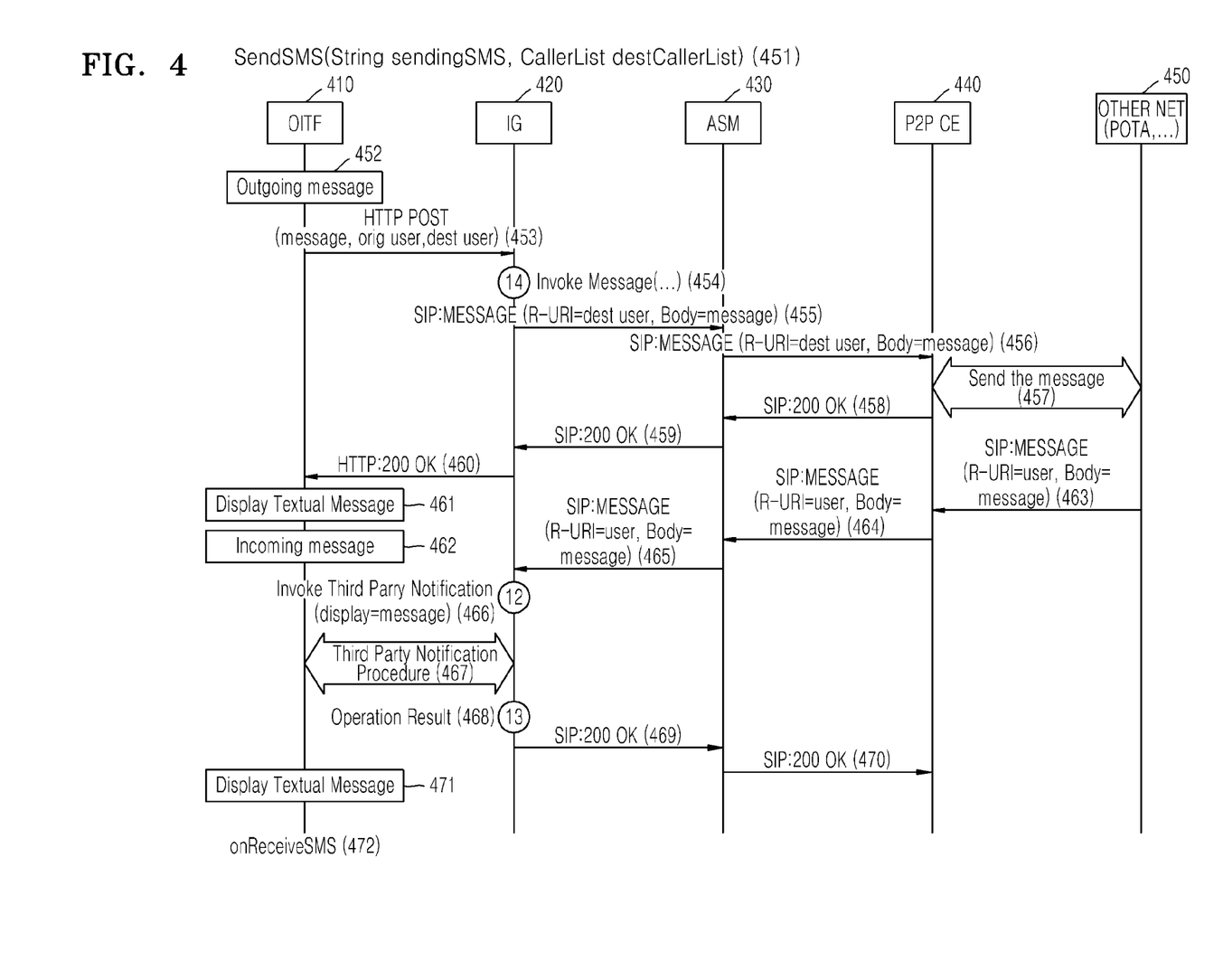
FIG. 4 is a flowchart illustrating transmitting and receiving application messages for providing an IPTV communication service without setting a session according to an exemplary embodiment of the present invention.

FIG. 4 is a flowchart illustrating transmitting and receiving application messages for the IPTV communication service without setting a session according to an exemplary embodiment of the present invention.

A user of an OITF entity apparatus 410 acquires a message for applications providing the IPTV communication service through the web application 111, in operation 452. The acquired application message is transmitted to the web browser 113 by using a "sendSMS" plug-in API 451. In the present exemplary embodiment, the sendSMS" plug-in API 451 is provided to acquire the application message. However, other plug-in APIs performing the same functions having other method names, other input arguments, and other return values may be used.

In operation 453, the IPTV middleware 117 of the OITF entity apparatus 410 transmits the application message to an IG functional entity apparatus 420 by using the HTTP protocol.

In operations 454 through 456, the application message is converted into the SIP and is transmitted to a P2P CE entity apparatus 440 from an IG functional entity apparatus 420 via an ASM entity apparatus 430. As illustrated in FIG. 4, a session that is previously set does not exist between the IG functional entity apparatus 420 and the P2P CE entity apparatus 440.

In operation 457, the application message is transmitted to a remote user who uses the POTS.

In operations 458 through 459, a response message including a result of processing the application message is transmitted to the IG functional entity apparatus 420 from the P2P CE entity apparatus 440 via the ASM entity apparatus 330 by using the SIP.

In operations 460 through 461, the OITF entity apparatus 410 receives the response message including the result of processing the application message from the IG functional entity apparatus 420 and outputs the result.

A user of the OITF entity apparatus 410 may receive an application message from a remote user who uses the IPTV communication service applications.

In operations 463 through 465, the application message received from the remote user is transmitted to the IG functional entity apparatus 420 from the remote user by using the SIP. In the present exemplary embodiment, the remote user who uses the IPTV communication service applications is a user using the POTS. However, the present exemplary embodiment may be applied to remote users who use other services.

In operations 466 through 470, the OITF entity apparatus 410 receives an event informing about reception of the application message from the IG functional entity apparatus 420.

In operation 471, the received application message is transmitted to the web browser 113 of the OITF entity apparatus 410 by using an "onReceiveSMS" plug-in API 472. The OITF entity apparatus 410 outputs the application message received through the web application 111. In the present embodiment, the "onReceiveSMS" plug-in API 472 is provided to process the event informing about the reception of the application message. Other plug-in APIs performing the same functions having other method names, other input arguments, and other return values may be used.

Figure 5:
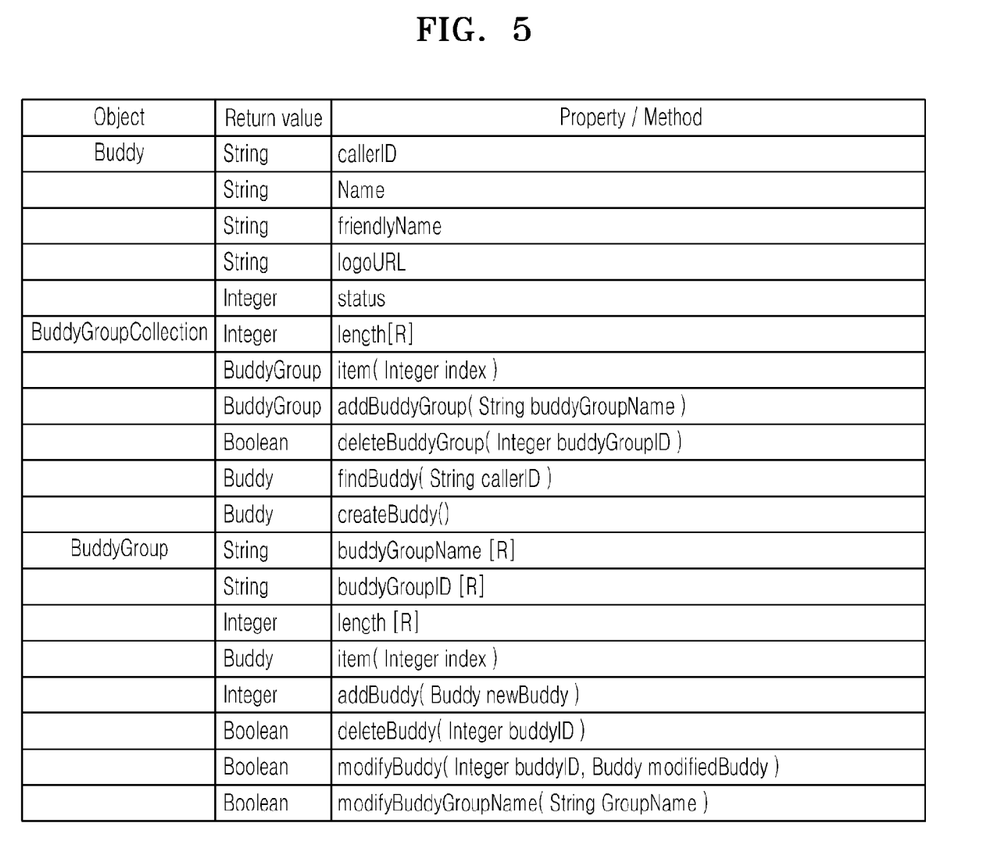
FIG. 5 is a table illustrating plug-in application programming interfaces (APIs) managing a list of users who use the IPTV communication services, and user groups formed of the list of users according to an exemplary embodiment of the present invention.

FIG. 5 is a table illustrating plug-in APIs managing a list of users who use the IPTV communication services, and user groups formed of the list of users according to an exemplary embodiment of the present invention.

A Buddy object includes a callerID property, a Name property, a friendlyName property, a logoURL property, and a status property, wherein the callerID property represents a callerID of a user, the Name property represents a name of the user, the friendlyName property represents a nickname of the user, the logoURL property represents a logo URL of the user, and the status property represents a state of the user.

A BuddyGroup object includes a buddyGroupName property, a buddyGroupID property, a length property, an item method, an addBuddy method, a deleteBuddy method, a modifyBuddy method, and a modifyBuddyGroupNam method, wherein the buddyGroupName property represents a name of user groups, the buddyGroupID property represents an identifier of the user group, the length property represents a length of the user in the user groups, the item method checking the users of a designated index, the addBuddy method adds the users, the deleteBuddy method deletes specific users, the modifyBuddy method modifies information of the specific users, and the modifyBuddyGroupName method modifies the name of specific user groups.

A BuddyGroupCollection object includes a length property, an item method, an addBuddyGroup method, a deleteBuddyGroup method, a findBuddy method, and a createBuddy method, wherein the length property represents the number of user groups formed of the list of users, the item method checking the user groups of a designated index, the addBuddyGroup method adding the user groups, the deleteBuddyGroup deleting specific user groups, the findBuddy method checking specific users by using callerIDs, and the createBuddy method generating an instance for adding specific users.

Figure 6:
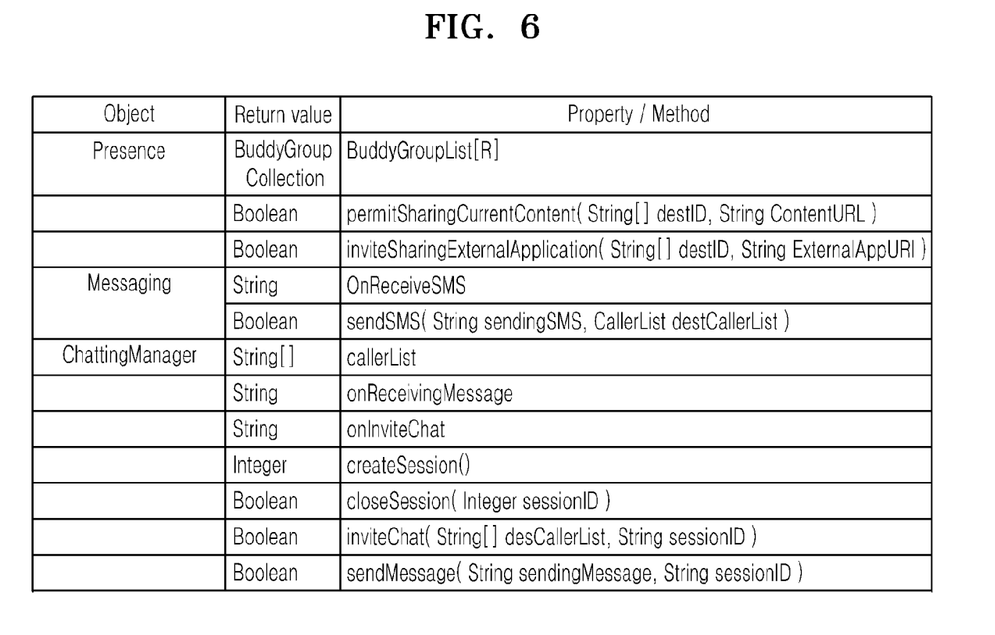
FIG. 6 is a table illustrating plug-in APIs for a presence application, an instant message application, and a chatting application according to an exemplary embodiment of the present invention.

FIG. 6 is a table illustrating plug-in APIs for the presence application, the instant message application, and the chatting application according to an exemplary embodiment of the present invention.

A presence object for the presence application includes a BuddyGroupList property, a permitSharingCurrentContent method, and an inviteSharingExternalApplication method, wherein the BuddyGroupList represents the user groups formed of the list of users, the permitSharingCurrentContent method provides a function of viewing contents of a current user together with another presence user, and the inviteSharingExternalApplication method provides a function of using an application of a current user together with another presence user.

A Messaging object for the instant message application includes an onReceiveSMS property and a sendSMS method, wherein the onReceiveSMS property informs reception of a message with a callback and the sendSMS method provides a function of sending a message.

A ChattingManager object for the chatting application includes a callerList property, an onReceivingMessage property, a onInviteChat property, a createSession method, a closeSession method, an inviteChat method, and a sendMessage method, wherein the callerList property represents a list of users who are able to chat, the onReceivingMessage property informs about reception of a message with a callback, the onInviteChat property informs about chatting invitation with a callback, the createSession method sets a session for the chatting application, the closeSession method completes a session for the chatting application, the inviteChat method provides a chatting inviting function to the list of selected users, and the sendMessage method sends a chatting message.

Figure 7:
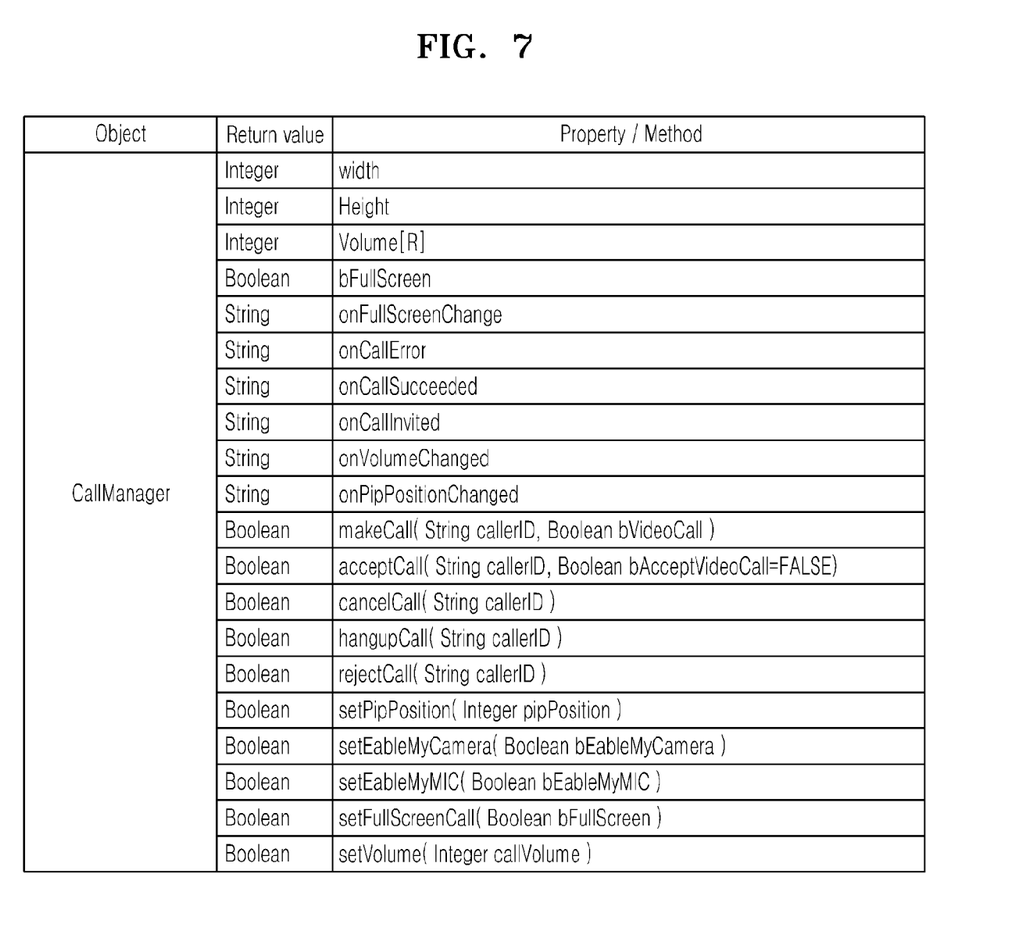
FIG. 7 is a table illustrating plug-in APIs for a voice over IP (VoIP) application and a multimedia over IP (MoIP) application according to an exemplary embodiment of the present invention.

FIG. 7 is a table illustrating plug-in APIs for the VoIP application and the MoIP application according to an embodiment of the present invention.

A CallManager object for the VoIP application and the MoIP application includes a width property, a height property, a volume property, a bFullScreen property, an onFullScreenChange property, an onCallError property, an onCallSucceeded property, an onCallInvited property, an onVolumeChanged property, an onPipPositionChanged property, a makeCall method, an acceptCall method, a cancelCall method, a hangupCall method, a rejectCall method, a setPipPosition method, a setEableMyCamera method, a setEableMyMIC method, a setFullScreenCall method, and a setVolume method, wherein the width property represents the width of a screen, the height property represents the height of a screen, the Volume property represents the volume, the bFullScreen property represents a setting state of a full screen, the onFullScreenChange property represents a change state of setting information of a full screen, the onCallError property informs about a phone call error event, the onCallSucceeded property informs a phone call success event, the onCallInvited property informs about a phone call invitation event, the onVolumeChanged property informs about a volume information change event, the onPipPositionChanged property informs about a PIP position information change event, the makeCall method sets a VoIP/MoIP connection, the acceptCall method receives the VoIP/MoIP connection, the cancelCall method cancels a VoIP/MoIP connection service, the hangupCall method stops the received VoIP/MoIP service, the rejectCall method rejects the VoIP/MoIP service, the setPipPosition method sets VoIP/MoIP screen position information, the setEableMyCamera method sets a camera of the MoIP service, the setEableMyMIC method sets a microphone of the VoIP/MoIP service, the setFullScreenCall method sets a full screen of the MoIP service, and the setVolume method sets the volume of the VoIP/MoIP.

Figure 8:
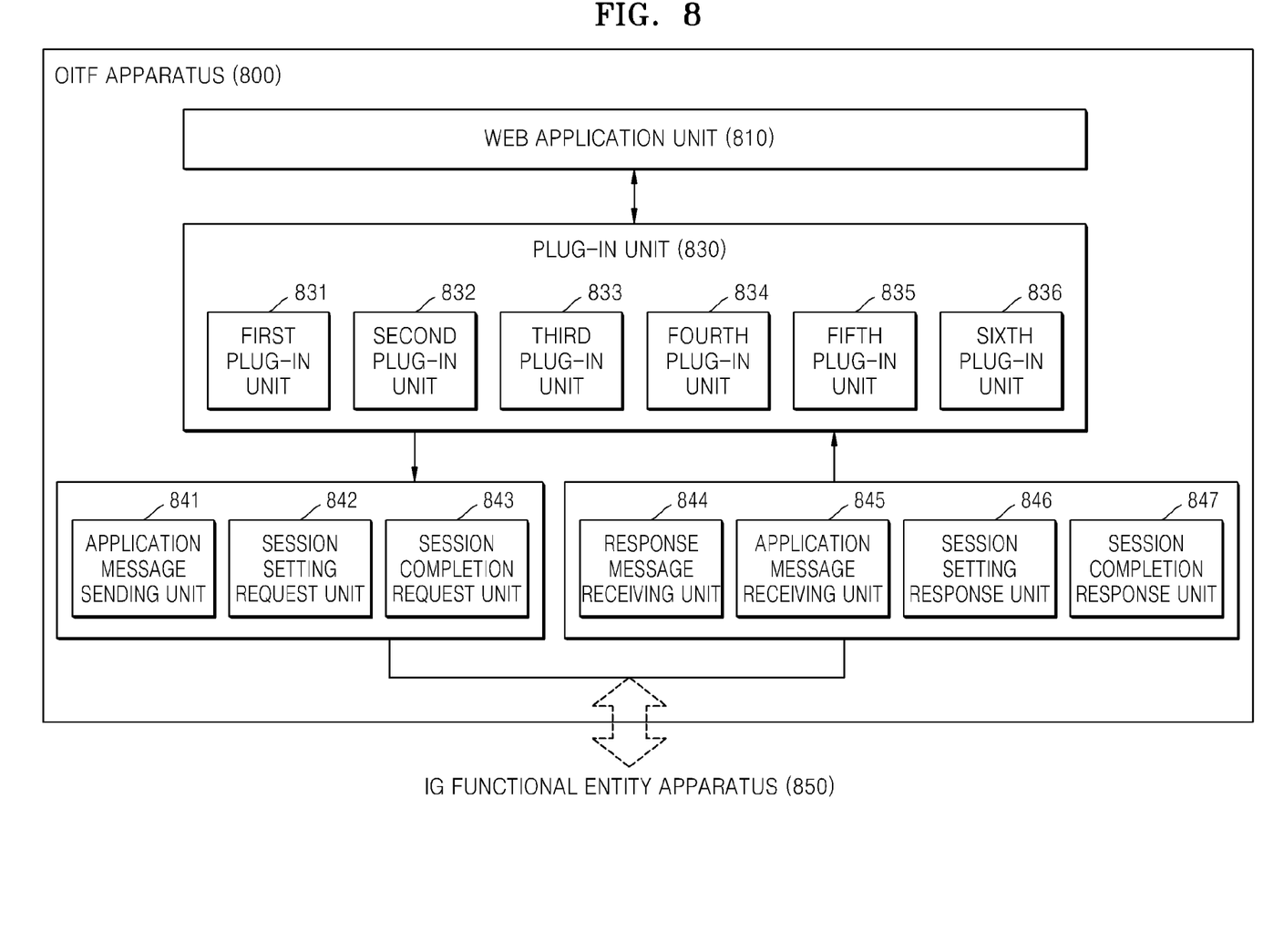
FIG. 8 is a block diagram of an open IPTV terminal function (OITF) apparatus according to an exemplary embodiment of the present invention.

FIG. 8 is a block diagram of an OITF apparatus 800 according to an exemplary embodiment of the present invention.

The OITF apparatus 800 according to the present exemplary embodiment includes a web application unit 810, a plug-in unit 830, an application message sending unit 841, a session setting request unit 842, a session completion request unit 843, a response message receiving unit 844, an application message receiving unit 845, a session setting response unit 846, a session completion response unit 847.

The plug-in unit 830 includes a first plug-in unit 831, a second plug-in unit 832, a third plug-in unit 833, a fourth plug-in unit 834, a fifth plug-in unit 835, and a sixth plug-in unit 836.

The first plug-in unit 831 acquires an application message for the IPTV communication service from an external input through a general-purpose web application by using plug-in APIs of a web browser which are independent of an IPTV communication service provider. The plug-in APIs for acquiring the application message for the IPTV communication service include remote user identifiers and a message to be set to the remote user as input arguments.

The application message sending unit 841 sends the application message to the IG functional entity apparatus 850.

The response message receiving unit 844 receives a response message including a result of processing the application message as a response to sending the application message from the IG functional entity apparatus 850.

The application message receiving unit 845 receives an application message for an IPTV communication service from the IG functional entity apparatus 850.

The second plug-in unit 832 transmits an application message to a web browser by using plug-in APIs for processing an event informing about reception of the application message. The plug-in APIs for processing an event informing about reception of the application message include the received message as return values.

The web application unit 810 outputs the application message through a general-purpose web application.

The third plug-in unit 833 acquires a session setting request message for an application providing the IPTV communication service from an external input through a general-purpose web application by using the plug-in APIs. The plug-in APIs for acquiring the session setting request message include a session identifier (ID) as a return value.

The session setting request unit 842 sends the session setting request message to the IG functional entity apparatus 850.

The session setting response unit 846 receives a response message for the session setting request message from the IG functional entity apparatus 850.

The fourth plug-in unit 834 acquires a session completion request message for an application providing the IPTV communication service from an external input through a general-purpose web application by using the plug-in APIs. The plug-in APIs for acquiring the session completion request message include a session ID as an input argument.

The session completion request unit 843 sends the session completion request message to the IG functional entity apparatus 850.

The session completion response unit 847 receives a response message for the session completion request message from the IG functional entity apparatus 850.

The fifth plug-in unit 835 performs at least one of the plug-in APIs providing a list of users who use the IPTV communication service, the length of the list of users, specific user information for a specific index in the list of users, a function of adding a specific user to the list of users, a function of deleting a specific user from the list of users, and a function of modifying a specific user in the list of users.

The sixth plug-in unit 836 performs at least one of the plug-in APIs providing the number of user groups formed of the list of users who use the IPTV communication service, specific user group information for a specific index in the user groups, a function of adding a specific user group to the user groups, and a function of deleting a specific user group from the user groups.

The OITF apparatus according to the exemplary embodiments of the present invention may include a bus coupled to each unit illustrated in the OITF apparatus of FIG. 8, at least one processor coupled to the bus, and a memory coupled to the bus for storing commands, received messages, or generated messages and the memory is coupled to the at least one processor for executing the commands.

The invention can also be embodied as computer readable codes on a computer readable recording medium. The computer readable recording medium is any data storage device that can store data which can be thereafter read by a computer system. Examples of the computer readable recording medium include storage medium such as magnetic storage medium (for example, read-only memory (ROM), floppy disks, and hard disks), and optical data storage devices (for example, CD-ROMs and DVDs). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of performing an internet protocol television (IPTV) communication service, the method comprising:
    acquiring a first application message for the IPTV communication service from an external input through a general-purpose web application by using a first plug-in application programming interface (API) of plug-in APIs of a web browser, the plug-in APIs being independent of an IPTV communication service provider;
    sending the first application message to an IP multimedia subsystem (IMS) gateway (IG) functional entity apparatus; and
    receiving a response message comprising a result of processing the sent first application message, from the IG functional entity apparatus,
    wherein the first plug-in API for acquiring the application message for the IPTV communication service provides access to an application of a different service provider than the IPTV communication service provider and comprises messages to be sent to a remote user and a remote user identifier as input arguments.

2. The method of claim 1, wherein an application providing the IPTV communication service comprises at least one of a chatting application, an instant message application, a Voice over IP (VoIP) application, a Multimedia over IP (MoIP) application, and a presence application.

3. The method of claim 1, further comprising:
    receiving a second application message for the IPTV communication service, from the IG functional entity apparatus;
    sending the second application message to the web browser by using one of the plug-in APIs for processing an event informing reception of the second application message; and
    outputting the second application message through the general-purpose web application.

4. The method of claim 3, wherein the one of the plug-in APIs for processing the event informing reception of the second application message comprises a received message as a return value.

5. The method of claim 3, wherein the one of the plug-in APIs for processing the event informing about reception of the second application message during a set session comprises a received message as a return value.

6. The method of claim 1, further comprising:
    acquiring a session setting request message for an application providing the IPTV communication service from an external input through the general-purpose web application by using one of the plug-in APIs for acquiring the session setting request message;
    sending the session setting request message to the IG functional entity apparatus; and
    receiving a response message for the session setting request message, from the IG entity apparatus.

7. The method of claim 6, wherein the sending of the first application message and the receiving of the response message comprising the result of processing the sent first application message, are performed during the set session.

8. The method of claim 7, wherein the first plug-in API for acquiring the first application message providing the IPTV communication service during the set session comprises a message to be sent to a remote user and a session ID as input arguments.

9. The method of claim 6, further comprising:
    acquiring a session completion request message for the application providing the IPTV communication service from an external input through the general-purpose web application by using one of the plug-in APIs for acquiring the session completion request message;
    sending the session completion request message to the IG functional entity apparatus; and
    receiving a response message for the session completion request message from the IG functional entity apparatus.

10. The method of claim 9, wherein the one of the plug-in APIs for acquiring the session completion request message comprises a session identifier (ID) as an input argument.

11. The method of claim 6, wherein the one of the plug-in APIs for acquiring the session setting request message comprises a session identifier (ID) as return values.

12. The method of claim 1, further comprising performing at least one of the plug-in APIs providing a list of users who use the IPTV communication service, a length of the list of users, specific user information for a specific index in the list of users, a function of adding a specific user to the list of users, a function of deleting a specific user from the list of users, and a function of modifying the specific user in the list of users.

13. The method of claim 1, further comprising performing at least one of the plug-in APIs providing a number of user groups in a list of users who use the IPTV communication service, specific user group information for a specific index in the user groups, a function of adding a specific user group to the user groups, and a function of deleting the specific user group from the user groups.

14. A non-transitory computer readable recording medium having embodied thereon a computer program for executing the method of claim 1.

15. An open an internet protocol television (IPTV) Terminal Function (OITF) entity apparatus comprising:
    a first plug-in unit which acquires a first application message for the IPTV communication service from an external input through a general-purpose web application by using a first plug-in application programming interface (API) of plug-in APIs of a web browser, the plug-in APIs being are independent of an IPTV communication service provider;

an application message sending unit which sends the first application message to an IP multimedia subsystem (IMS) gateway (IG) functional entity apparatus; and a response message receiving unit which receives a response message comprising a result of processing the sent first application message, from the IG functional entity apparatus, wherein the first plug-in unit performs the first plug-in API for acquiring the first application message providing the IPTV communication service, the first plug-in API providing access to an application from a different service provider than the IPTV communication service provider and comprising messages to be sent to a remote user and a remote user identifier as input arguments.

16. The apparatus of claim 15, wherein an application providing the IPTV communication service comprises at least one of a chatting application, an instant message application, a Voice over IP (VoIP) application, a Multimedia over IP (MoIP) application, and a presence application.

17. The apparatus of claim 15, further comprising:
an application message receiving unit which receives a second application message for the IPTV communication service, from the IG functional entity apparatus;
a second plug-in unit which sends the second application message to the web browser by using one of the plug-in APIs for processing an event informing reception of the second application message; and
a web application unit which outputs the second application message through the general-purpose web application.

18. The apparatus of claim 17, wherein the second plug-in unit performs the one of the plug-in APIs for processing the event informing about reception of the second application message, the one of the plug-in APIs for processing the event informing about reception of the second application message, comprising a received message as a return value.

19. The apparatus of claim 17, wherein the second plug-in unit performs the one of the plug-in APIs for processing the event informing reception of the second application message during a set session, the one of the plug-in APIs for processing the event informing reception of the second application message comprising a received message as a return value.

20. The apparatus of claim 15, further comprising:
a second plug-in unit which acquires a session setting request message for an application providing the IPTV communication service from an external input through the general-purpose web application by using one of the plug-in APIs for acquiring the session setting request message;
a session setting request unit which sends the session setting request message to the IG functional entity apparatus; and
a session setting response unit which receives a response message for the session setting request message from the IG functional entity apparatus.

21. The apparatus of claim 20, wherein the sending of the first application message and the receiving of the response message comprising the result of processing the sent first application message, are performed during the set session.

22. The apparatus of claim 21, wherein the first plug-in unit performs the first plug-in API for acquiring the application message providing the IPTV communication service during the set session, the first plug-in API comprising messages to be sent to a remote user and a session ID as input arguments.

23. The apparatus of claim 20, further comprising:
a third plug-in unit which acquires a session completion request message for the application providing the IPTV communication service from an external input through the general-purpose web application by using one of the plug-in APIs for acquiring the session completion request message;
a session completion request unit which sends the session completion request message to the IG functional entity apparatus; and
a session completion response unit which receives a response message for the session completion request message from the IG functional entity apparatus.

24. The apparatus of claim 23, wherein the third plug-in unit performs the one of the plug-in APIs for acquiring the session completion request message, the one of the plug-in APIs for acquiring the session completion request message comprising a session identifier (ID) as an input argument.

25. The apparatus of claim 20, wherein the second plug-in unit performs the one of the plug-in APIs for acquiring the session setting request message, the one of the plug-in APIs for acquiring the session setting request message comprising a session identifier (ID) as return values.

26. The apparatus of claim 15, further comprising a second plug-in unit which performs at least one of the plug-in APIs providing a list of users who use the IPTV communication service, a length of the list of users, specific user information for a specific index in the list of users, a function of adding a specific user to the list of users, a function of deleting a specific user from the list of users, and a function of modifying the specific user in the list of users.

27. The apparatus of claim 15, further comprising a second plug-in unit which performs at least one of the plug-in APIs providing the number of user groups formed of the list of users who use the IPTV communication service, specific user group information for a specific index in the user groups, a function of adding a specific user group to the user groups, and a function of deleting the specific user group from the user groups.

* * * * *